US008698476B2

(12) United States Patent
Chen et al.

(10) Patent No.: US 8,698,476 B2
(45) Date of Patent: Apr. 15, 2014

(54) CONTROL CIRCUIT AND METHOD FOR A CURRENT MODE CONTROLLED POWER CONVERTER

(75) Inventors: Wen-Wei Chen, Taipei (TW); Kuo-Chi Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 112 days.

(21) Appl. No.: 13/280,471

(22) Filed: Oct. 25, 2011

(65) Prior Publication Data

US 2012/0105030 A1 May 3, 2012

(30) Foreign Application Priority Data

Oct. 28, 2010 (TW) ................................ 99136976 A

(51) Int. Cl.
*G05F 1/00* (2006.01)
(52) U.S. Cl.
USPC ............ 323/288; 323/243; 323/282; 323/285

(58) Field of Classification Search
USPC ......... 323/222, 242, 243, 271, 282, 283, 284, 323/285, 288
See application file for complete search history.

(56) References Cited

U.S. PATENT DOCUMENTS

| 4,975,820 A * | 12/1990 | Szepesi ...................... 363/21.17 |
| 6,396,252 B1 * | 5/2002 | Culpepper et al. ............. 323/285 |
| 8,395,367 B2 * | 3/2013 | Chien et al. ................... 323/288 |

* cited by examiner

*Primary Examiner* — Nguyen Tran
(74) *Attorney, Agent, or Firm* — Muncy, Geissler, Olds & Lowe, P.C.

(57) ABSTRACT

A control circuit and method for a current mode controlled power converter to convert an input voltage into an output voltage, dynamically adjust the peak or the valley of a ramp signal depending on either or both of the input voltage and the output voltage. Under different conditions of the input voltage and the output voltage, the current mode controlled power converter can generate stable output voltages with an invariant inductor and an invariant compensation circuit, without sub-harmonic which otherwise may happen.

10 Claims, 20 Drawing Sheets

| Vo | Rd1 (kΩ) | Rd2 (kΩ) | Rc (kΩ) | Cc (nF) | Cout (μF) | L (μH) |
|---|---|---|---|---|---|---|
| 12V | 88.7 | 10 | 62 | 0.82 | 22 | 33 |
| 5V | 30 | 10 | 20 | 2.2 | 22 | 22 |
| 3.3V | 17 | 10 | 10 | 1.5 | 22 | 15 |
| 2.5V | 10.45 | 10 | 7.5 | 1.5 | 22 | 10 |
| 1.8V | 4.75 | 10 | 6 | 1.5 | 22 | 10 |
| 1.222V | 0 | 10 | 6 | 3.9 | 22 | 6.8 |

Fig. 14
Prior Art

| Vo | Rd1 (kΩ) | Rd2 (kΩ) | Rc (kΩ) | Cc (nF) | Cout (μF) | L (μH) |
|---|---|---|---|---|---|---|
| 12V | 88.7 | 10 | 10 | 1.5 | 22 | 15 |
| 5V | 30 | 10 | 10 | 1.5 | 22 | 15 |
| 3.3V | 17 | 10 | 10 | 1.5 | 22 | 15 |
| 2.5V | 10.45 | 10 | 10 | 1.5 | 22 | 15 |
| 1.8V | 4.75 | 10 | 10 | 1.5 | 22 | 15 |
| 1.222V | 0 | 10 | 10 | 1.5 | 22 | 15 |

Fig. 15

CONTROL CIRCUIT AND METHOD FOR A CURRENT MODE CONTROLLED POWER CONVERTER

FIELD OF THE INVENTION

The present invention is related generally to a power converter and, more particularly, to a current mode controlled power converter.

BACKGROUND OF THE INVENTION

The input to output voltage conversion ratio of a current mode controlled power converter will affect the duty cycle that is produced by the control circuit of the current mode controlled power converter. When the duty cycle is larger than 50%, sub-harmonic may happen and cause the power converter seriously unstable and thereby the connected load abnormally operative. For current mode controlled power converters, a popular solution to eliminate sub-harmonic is to add a ramp signal into the modulator for generating modulation signals.

For example, as shown in FIG. 1, a current mode controlled buck power converter includes a buck switching regulator 10 for converting an input voltage Vin into an output voltage Vo, and a control circuit 12 for providing control signals Sq1 and Sq2 to drive the buck switching regulator 10. The control circuit 12 includes a current sense gain circuit 16 for detecting the inductor current IL of an inductor L in the buck switching regulator 10 to generate a current sense signal CS, a ramp generator 20 for providing a ramp signal Vramp for eliminating sub-harmonic, a feedback circuit 26 having two serially connected resistors Rd1 and Rd2 for dividing the output voltage Vo to generate a feedback signal Vfb, a compensation circuit 24 for amplifying the difference between the feedback signal Vfb and a reference voltage Vref1 to generate an error signal Vcomp, a modulator 17 for generating a modulation signal Sc according to the signals CS, Vramp and Vcomp, and a driver 14 for generating the control signals Sq1 and Sq2 responsive to the modulation signal Sc. The modulator 17 includes an adder 18 for adding the current sense signal CS and the ramp signal Vramp to generate a modified current sense signal CS', and a comparator 22 for comparing the current sense signal CS' with the error signal Vcomp to generate the modulation signal Sc. However, the existing power converters are made suitable for wide range input voltage and wide range output voltage, and therefore, if a constant ramp signal Vramp is used to eliminate sub-harmonic, then users or designers have to adapt the inductor L to different conditions of the input voltage and the output voltage, otherwise sub-harmonic will still happen in certain conditions of the input voltage and output voltage. This is an inconvenience to users and designers. In addition, any change to the inductor L requires corresponding change to the compensation design of the entire system loop, or the system loop would have its stability impaired.

For adaptive applications of different output voltages Vo, the existing current mode controlled power converter always provides a recommended component selection for users to select suitable component parameters depending on the application condition to ensure the system circuit to have stable power output under this condition. As the inductor L and the compensation parameters have to be altered for different conditions of the input voltage Vin and the output voltage Vo, the existing current mode controlled power converters always have more complicated recommended component selections.

SUMMARY OF THE INVENTION

An objective of the present invention is to provide a control circuit and method for a current mode controlled power converter.

Another objective of the present invention is to provide a control circuit and method for a current mode controlled power converter for dynamically adjusting the ramp signal thereof, depending on either or both of the input voltage and the output voltage of the current mode controlled power converter.

According to the present invention, a control circuit for a current mode controlled power converter includes a feedback circuit to detect the output voltage of the current mode controlled power converter to generate a feedback signal, a compensation circuit to amplify the difference between the feedback signal and a reference voltage to generate an error signal, a current sense gain circuit to detect the inductor current of the current mode controlled power converter to generate a current sense signal, a ramp generator to provide a ramp signal, a modulator to generate a modulation signal according to the error signal, the current sense signal and the ramp signal, and a driver to generate a control signal responsive to the modulation signal to switch at least one power switch of the current mode controlled power converter to convert an input voltage into the output voltage. The peak or the valley of the ramp signal is adjusted depending on either or both of the input voltage and the output voltage.

According to the present invention, a control method for a current mode controlled power converter includes detecting the output voltage of the current mode controlled power converter to generate a feedback signal, amplifying the difference between the feedback signal and a reference voltage to generate an error signal, detecting the inductor current of the current mode controlled power converter to generate a current sense signal, providing a ramp signal, generating a modulation signal according to the error signal, the current sense signal and the ramp signal, and generating a control signal responsive to the modulation signal to switch at least one power switch of the current mode controlled power converter to convert an input voltage into the output voltage. The peak or the valley of the ramp signal is adjusted depending on either or both of the input voltage and the output voltage.

By adjusting the peak or the valley of the ramp signal depending on either or both of the input voltage and the output voltage, the current mode controlled power converter will have a good stability under different conditions of the input voltage and the output voltage, without changing parameters of the inductor and the compensation circuit.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which:

FIG. 14 is a recommended component selection when the circuit of FIG. 12 uses a conventional method;

FIG. 15 is a simplified recommended component selection according to the present invention;

DETAILED DESCRIPTION OF THE INVENTION

Figure 1:
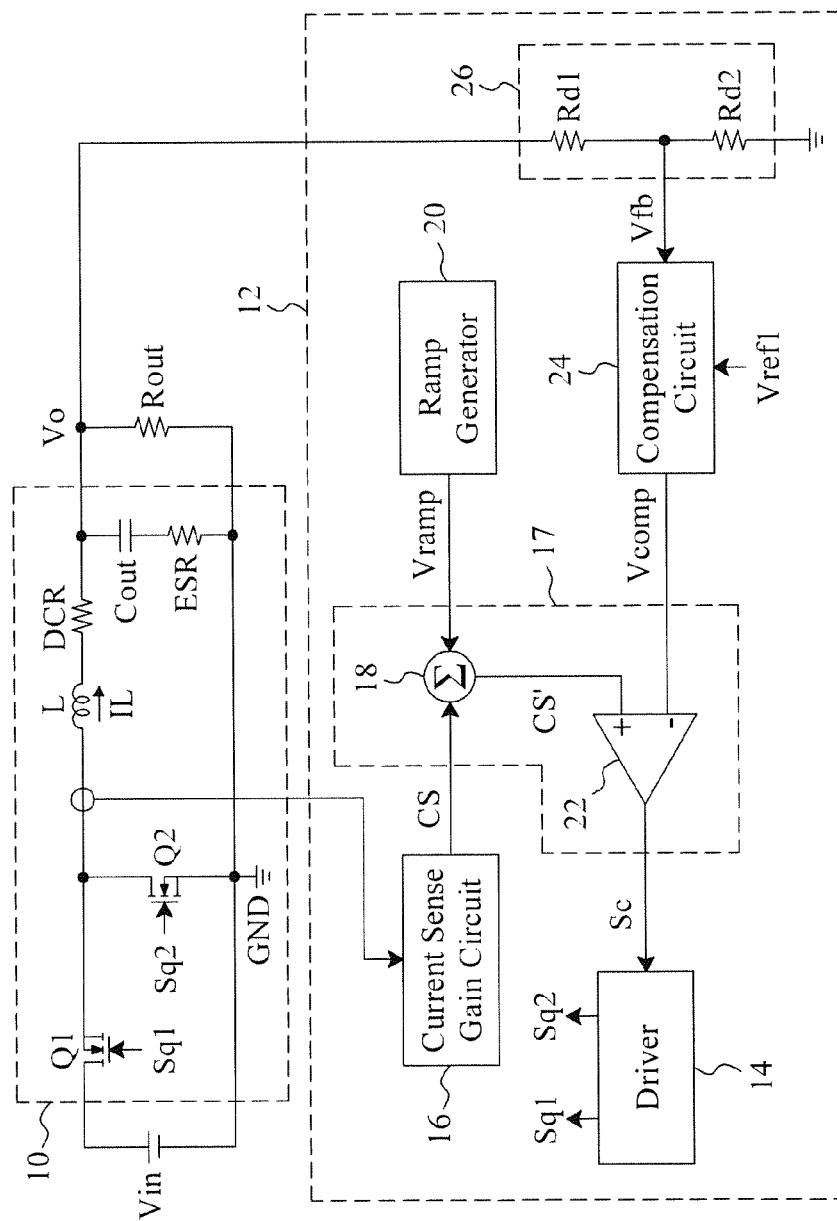
FIG. 1 is a circuit diagram of a conventional current mode controlled buck power converter.
Figure 2:
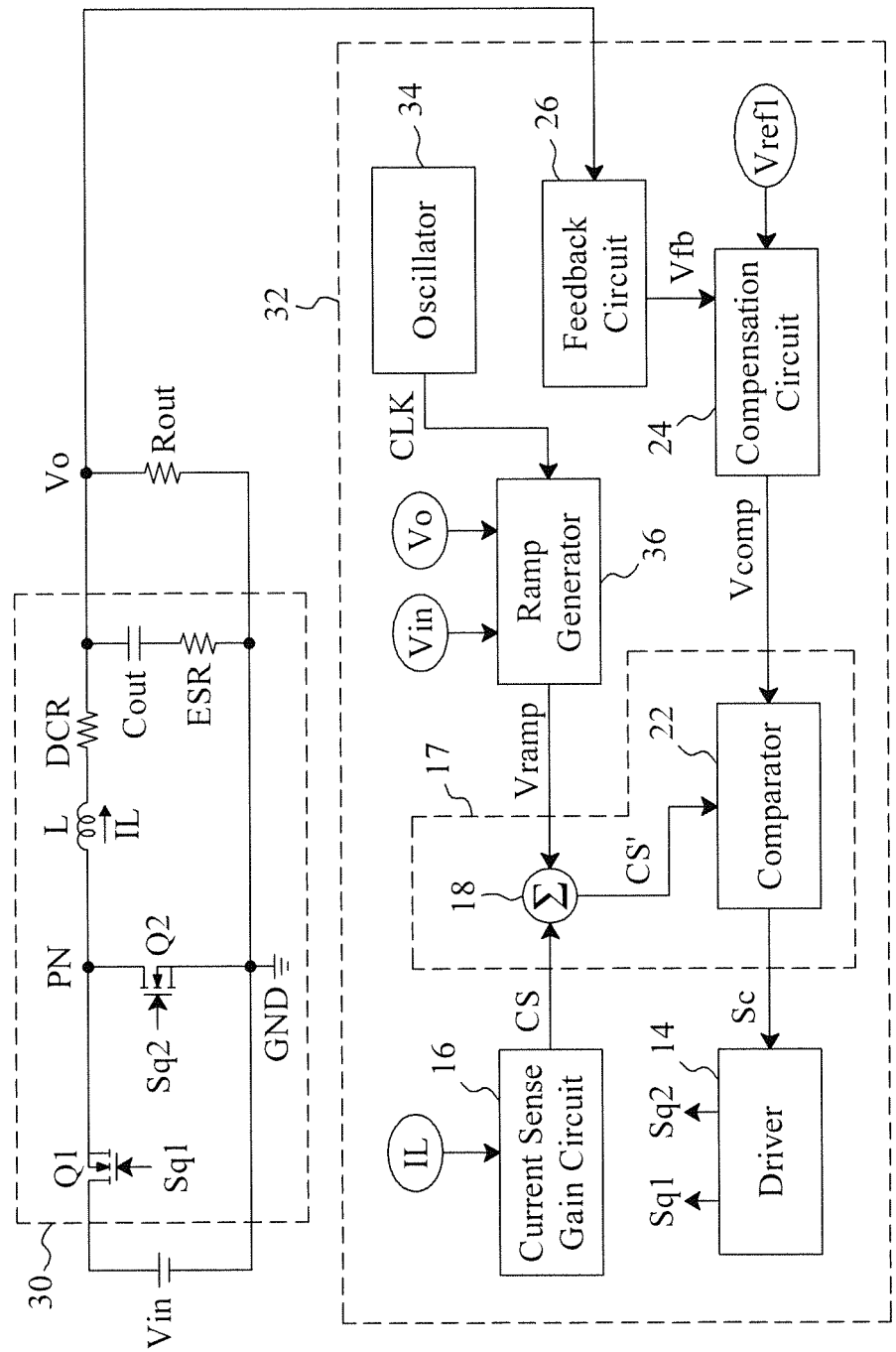
FIG. 2 is a circuit diagram of a current mode controlled buck power converter using a control circuit according to the present invention.

FIG. 2 is a circuit diagram of a current mode controlled buck power converter using a control circuit according to the present invention, which includes a buck switching regulator 30 for converting an input voltage Vin into an output voltage Vo, and a control circuit 32 for providing control signals Sq1 and Sq2 to drive the buck switching regulator 30. The buck switching regulator 30 includes a power switch Q1 connected between a power input terminal Vin and a phase node PN and controlled by the control signal Sq1, a power switch Q2 connected between the phase node PN and a ground terminal GND and controlled by the control signal Sq2, an inductor L connected between the phase node PN and a power output terminal Vo, and a capacitor Cout connected between the power output terminal Vo and the ground terminal GND. Similar to the control circuit 12 shown in FIG. 1, this control circuit 32 also has the driver 14, the current sense gain circuit 16, the modulator 17, the compensation circuit 24 and the feedback circuit 26. However, the control circuit 32 further has an oscillator 34 for providing a clock CLK for a ramp generator 36 to provide a ramp signal Vramp. Particularly, the ramp generator 36 controls its bandwidth according to the clock CLK, and dynamically adjusts, increasing or decreasing, the peak or the valley of the ramp signal Vramp depending on either or both of the input voltage Vin and the output voltage Vo. Since the ramp signal Vramp is dynamically adjusted depending on either or both of the input voltage Vin and the output voltage Vo, the output voltage Vo can remain stable under different conditions of the input voltage Vin and the output voltage Vo, without changing the inductor L, while eliminating sub-harmonic which otherwise may happen. Since the inductor L is invariant for different conditions of the input voltage Vin and the output voltage Vo, the compensation parameters of the system loop needs no changes.

Figure 3:
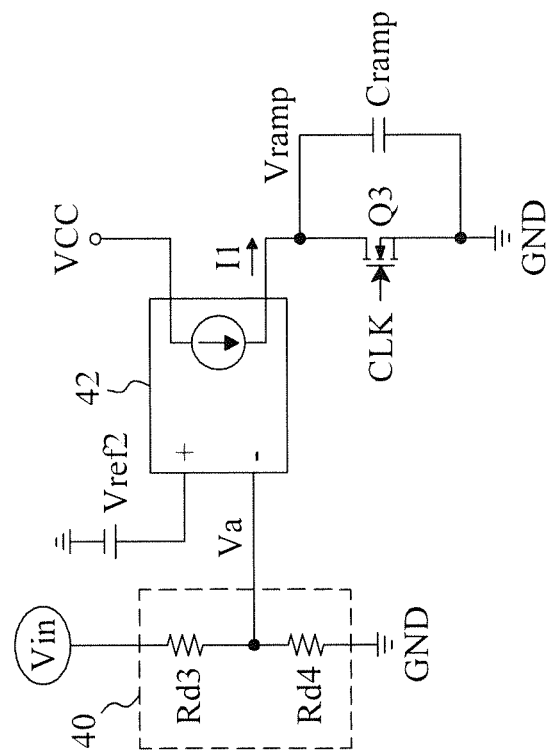
FIG. 3 is a circuit diagram of a first embodiment for the ramp generator shown in FIG. 2.

FIG. 3 is a circuit diagram of a first embodiment for the ramp generator 36 shown in FIG. 2, which includes a voltage divider 40, a voltage controlled current source 42, a switch Q3 and a capacitor Cramp. The switch Q3 is shunt to the capacitor Cramp and switched by the clock CLK for the capacitor Cramp to be charged or discharged to generate the ramp signal Vramp. The voltage divider 40 divides the input voltage Vin to generate an input voltage dependent signal Va. The voltage controlled current source 42 has a positive input terminal receiving a reference voltage Vref2 larger than the signal Va, and a negative input terminal receiving the input voltage dependent signal Va, and provides a charge current I1 for charging the capacitor Cramp responsive to the differential voltage between the reference voltage Vref2 and the input voltage dependent signal Va to adjust the peak of the ramp signal Vramp. As the input voltage Vin decreases, the differential voltage between the reference voltage Vref2 and the input voltage dependent signal Va increases, so the charge current I1 increases, and therefore the peak of the ramp signal Vramp increases.

Figure 4:
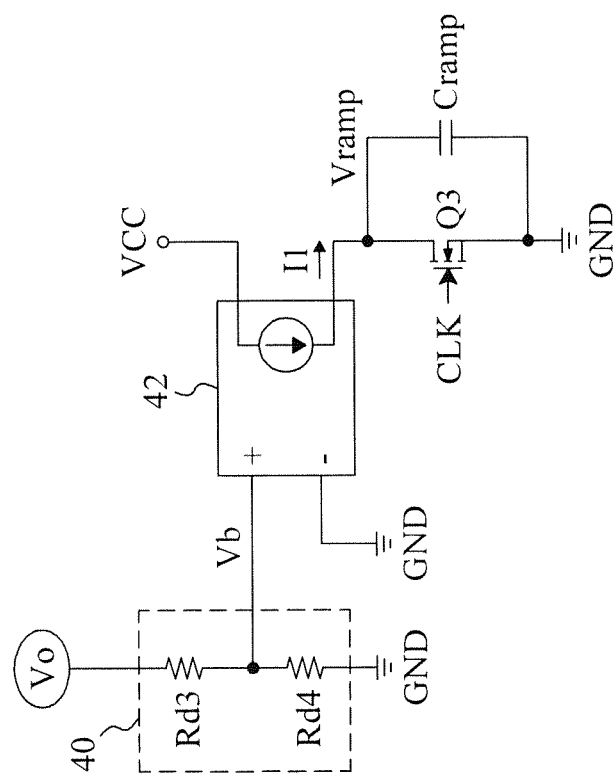
FIG. 4 is a circuit diagram of a second embodiment for the ramp generator shown in FIG. 2.

FIG. 4 is a circuit diagram of a second embodiment for the ramp generator 36 shown in FIG. 2, which includes the same elements 40, 42, Q3 and Cramp as that of FIG. 3, while the voltage divider 40 divides the output voltage Vo to generate an output voltage dependent signal Vb applied to the positive input terminal of the voltage controlled current source 42, and the negative input terminal of the voltage controlled current source 42 is grounded. Thus, the charge current I1 provided by the voltage controlled current source 42, and thereby the peak of the ramp signal Vramp, is adjusted by the differential voltage between the output voltage dependent signal Vb and the ground potential GND. The smaller the output voltage Vo is, the smaller the output voltage dependent signal Vb is, so the smaller the differential voltage between the output voltage dependent signal Vb and the ground potential GND, and thereby the smaller the charge current I1 is, and the smaller the peak of the ramp signal Vramp is.

Figure 5:
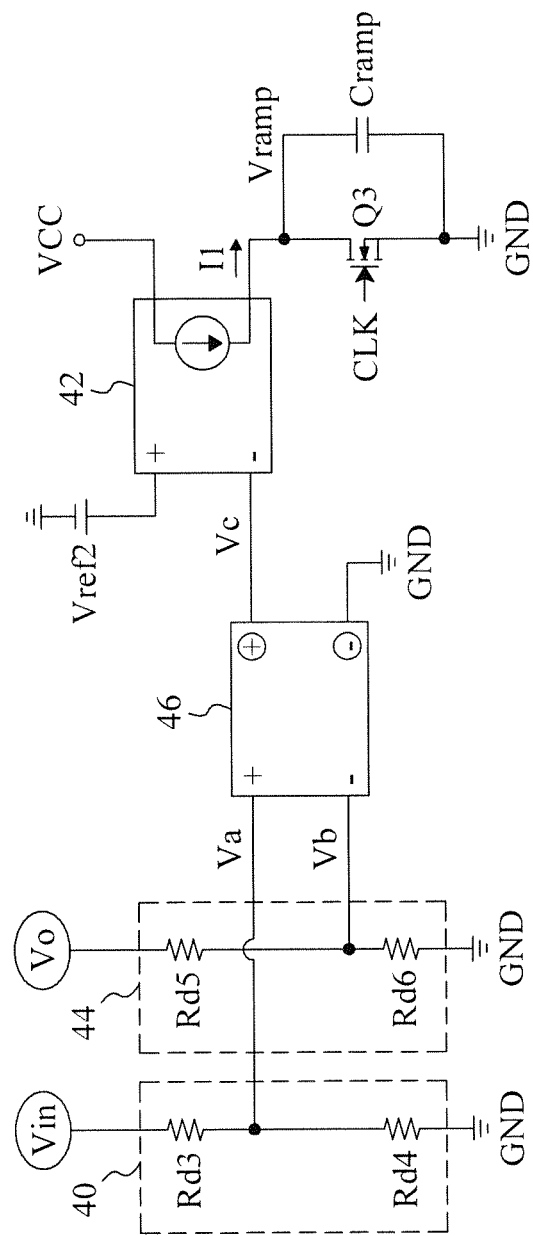
FIG. 5 is a circuit diagram of a third embodiment for the ramp generator shown in FIG. 2.

FIG. 5 is a circuit diagram of a third embodiment for the ramp generator 36 shown in FIG. 2. In addition to the voltage divider 40, the voltage controlled current source 42, the switch Q3 and the capacitor Cramp similar to those shown in FIG. 3, this embodiment further includes a voltage divider 44 for dividing the output voltage Vo to generate an output voltage dependent signal Vb, and a voltage controlled voltage source 46 for generating a differential voltage Vc responsive to the difference between the signals Va and Vb. In this embodiment, since the input voltage Vin is larger than the output voltage Vo, the input voltage dependent signal Va is larger than the output voltage dependent signal Vb. The voltage controlled current source 42 has its positive input terminal and negative input terminal receiving the reference voltage Vref2 and the differential voltage Vc, respectively, and thus adjusts the charge current I1 responsive to the difference between the reference voltage Vref2 and the differential voltage Vc. As the input voltage Vin and the output voltage Vo become closer to each other, the duty cycle of the power switch Q1 increases, and the difference between the signals Va and Vb decreases. This reduces the differential voltage Vc, and therefore causes the difference between the reference voltage Vref2 and the differential voltage Vc increases, thereby increasing the peak of the ramp signal Vramp.

Figure 6:
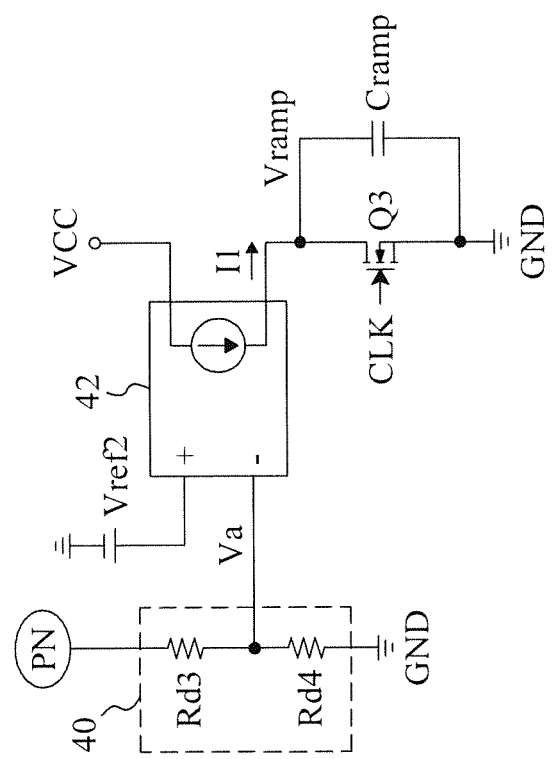
FIG. 6 is a circuit diagram of a fourth embodiment for the ramp generator shown in FIG. 2.

The input voltage Vin and the output voltage Vo shown in the circuits of FIG. 3 through FIG. 5 may be replaced by other signals related to the input voltage Vin and other signals related to the output voltage Vo. For example, the voltage on the phase node PN and the feedback signal Vfb may be used instead. FIG. 6 is a circuit diagram of a fourth embodiment for the ramp generator 36 shown in FIG. 2, which has the same circuit as that of FIG. 3, while the input voltage Vin is replaced by the voltage on the phase node PN. In this embodiment, the voltage divider 40 divides the voltage on the phase node PN, which is related to the input voltage Vin, to generate the input voltage dependent signal Va. As the input voltage Vin decreases, the voltage on the phase node PN decreases, so the differential voltage between the reference voltage Vref2 and the input voltage dependent signal Va becomes larger, thereby increasing the charge current I1 and in turn increasing the peak of the ramp signal Vramp.

Figure 7:
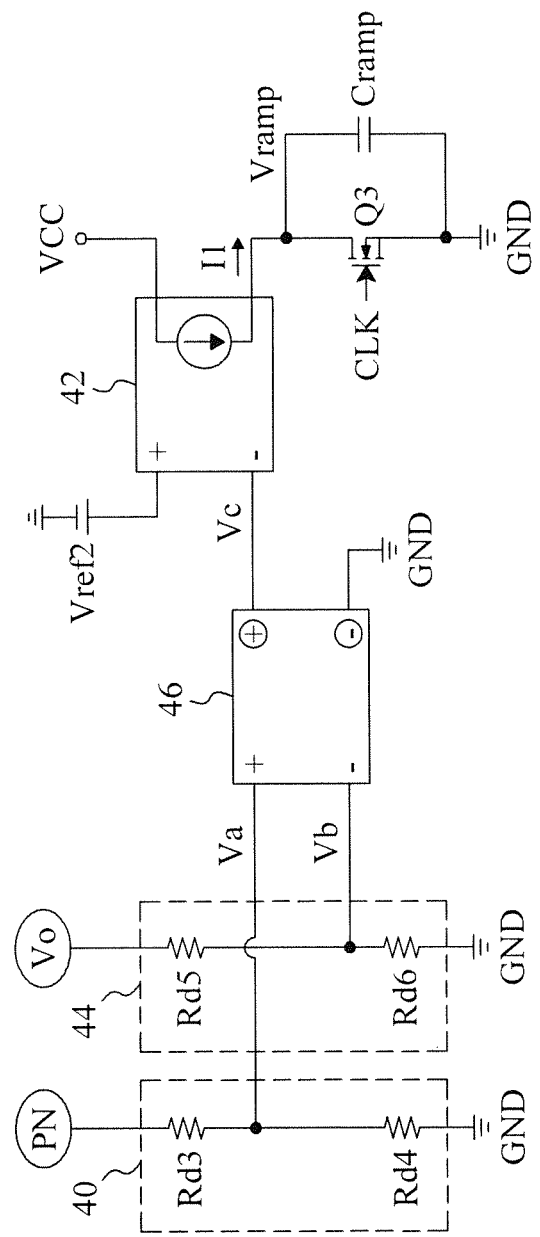
FIG. 7 is a circuit diagram of a fifth embodiment for the ramp generator shown in FIG. 2.

FIG. 7 is a circuit diagram of a fifth embodiment for the ramp generator 36 shown in FIG. 2, by modifying the circuit of FIG. 5 with the input voltage Vin replaced by the voltage on the phase node PN. As the input voltage Vin and the output voltage Vo are closer to each other, the difference between the signals Va and Vb becomes smaller, which reduces the differential voltage Vc and thus increases the difference between the reference voltage Vref2 and the differential voltage Vc, thereby increasing the peak of the ramp signal Vramp.

Figure 16:
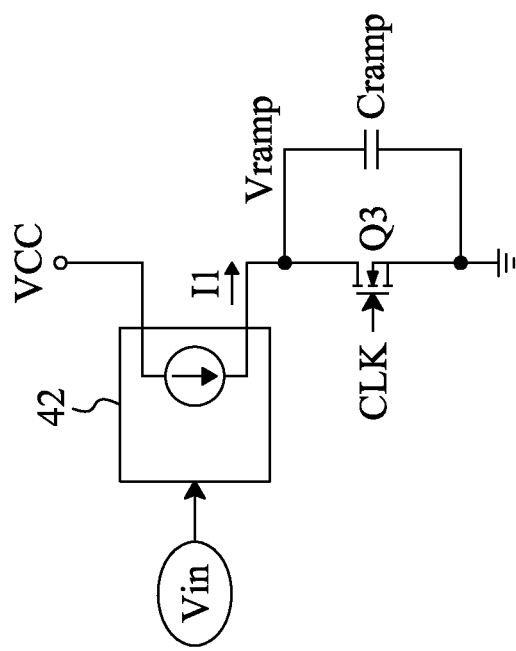
FIG. 16 is a circuit diagram of a sixth embodiment for the ramp generator shown in FIG. 2.

FIG. 16 is a circuit diagram of a sixth embodiment for the ramp generator 36 shown in FIG. 2, which includes the same elements 42, Q3 and Cramp as that of FIG. 3, while the voltage controlled current source 42 receives the input voltage Vin and generates the charge current I1 for charging the capacitor Cramp responsive to the input voltage Vin to adjust the peak of the ramp signal Vramp. As the input voltage Vin decreases, the charge current I1 increases, and therefore the peak of the ramp signal Vramp increases.

Figure 17:
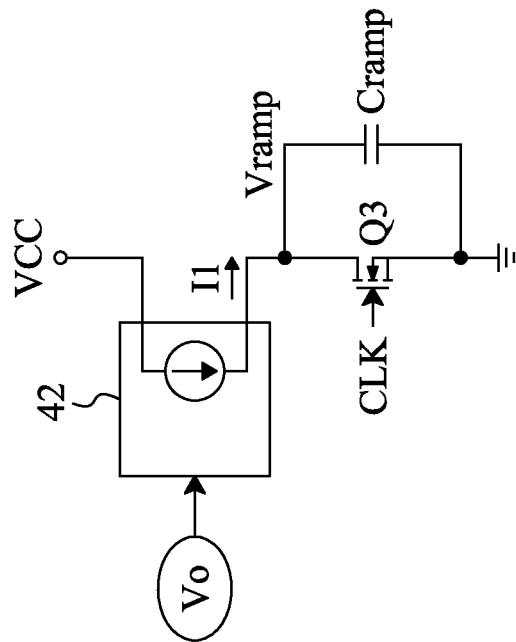
FIG. 17 is a circuit diagram of a seventh embodiment for the ramp generator shown in FIG. 2.

FIG. 17 is a circuit diagram of a seventh embodiment for the ramp generator 36 shown in FIG. 2, which includes the same elements 42, Q3 and Cramp as that of FIG. 3, while the voltage controlled current source 42 receives the output voltage V0 and generates the charge current I1 for charging the capacitor Cramp responsive to the output voltage V0 to adjust the peak of the ramp signal Vramp. The smaller the output voltage V0 is, the smaller the charge current I1 is, and the smaller the peak of the ramp signal Vramp is.

Figure 18:
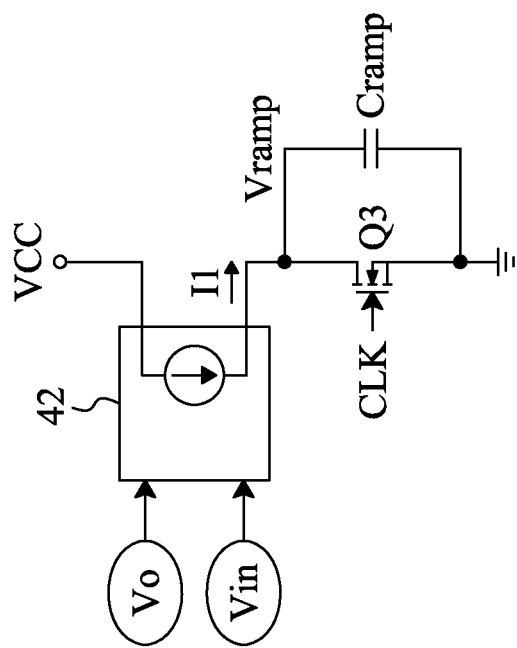
FIG. 18 is a circuit diagram of an eighth embodiment for the ramp generator shown in FIG. 2.

FIG. 18 is a circuit diagram of an eighth embodiment for the ramp generator 36 shown in FIG. 2, which includes the same elements 42, Q3 and Cramp as that of FIG. 3, while the voltage controlled current source 42 receives the input voltage Vin and the output voltage V0 and generates the charge current I1 for charging the capacitor Cramp responsive to the difference between the input voltage Vin and the output voltage V0 to adjust the peak of the ramp signal Vramp. As the input voltage Vin decreases, the input voltage Vin and the output voltage V0 become closer to each other, thereby increasing the peak of the ramp signal Vramp.

Figure 19:
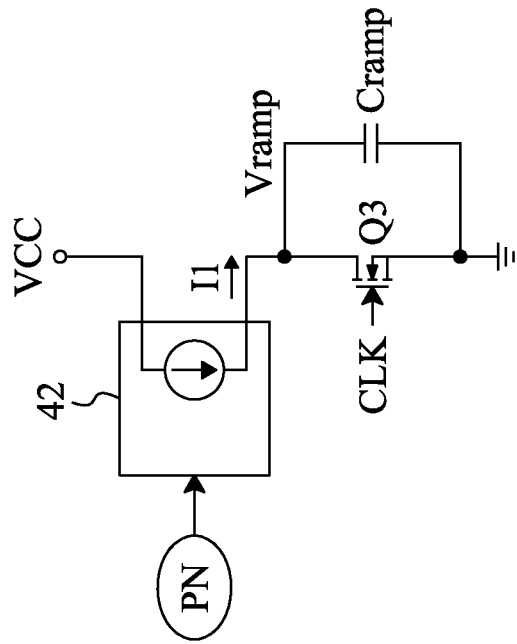
FIG. 19 is a circuit diagram of a ninth embodiment for the ramp generator shown in FIG. 2.

FIG. 19 is a circuit diagram of a ninth embodiment for the ramp generator 36 shown in FIG. 2, which has the same circuit as that of FIG. 16, while the input voltage Vin is replaced by the voltage on the phase node PN. As the input voltage Vin decreases, the voltage on the phase node PN decreases, thereby increasing the charge current I1 and in turn increasing the peak of the ramp signal Vramp.

Figure 20:
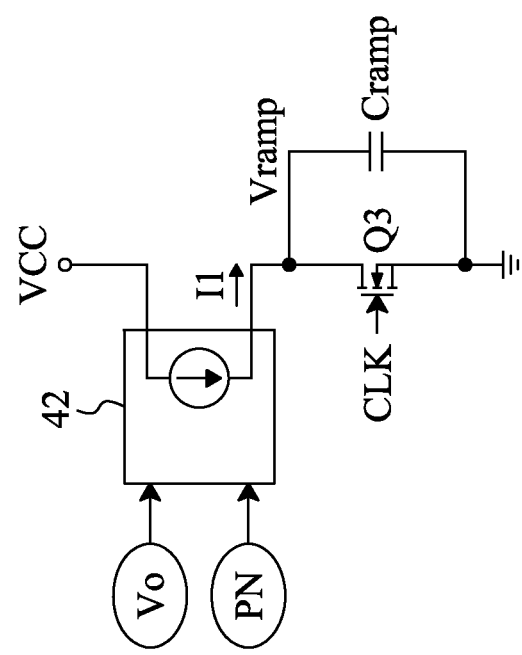
FIG. 20 is a circuit diagram of a tenth embodiment for the ramp generator shown in FIG. 2.

FIG. 20 is a circuit diagram of a tenth embodiment for the ramp generator 36 shown in FIG. 2, by modifying the circuit of FIG. 18 with the input voltage Vin replaced by the voltage on the phase node PN. As the input voltage Vin and the output voltage V0 become closer to each other, the peak of the ramp signal Vramp increases. As the input voltage Vin decreases, the voltage on the phase node PN decreases, so the differential voltage between the voltage on the phase node PN and the output voltage Vo becomes smaller, thereby increasing the charge current I1 and in turn increasing the peak of the ramp signal Vramp.

Figure 21:
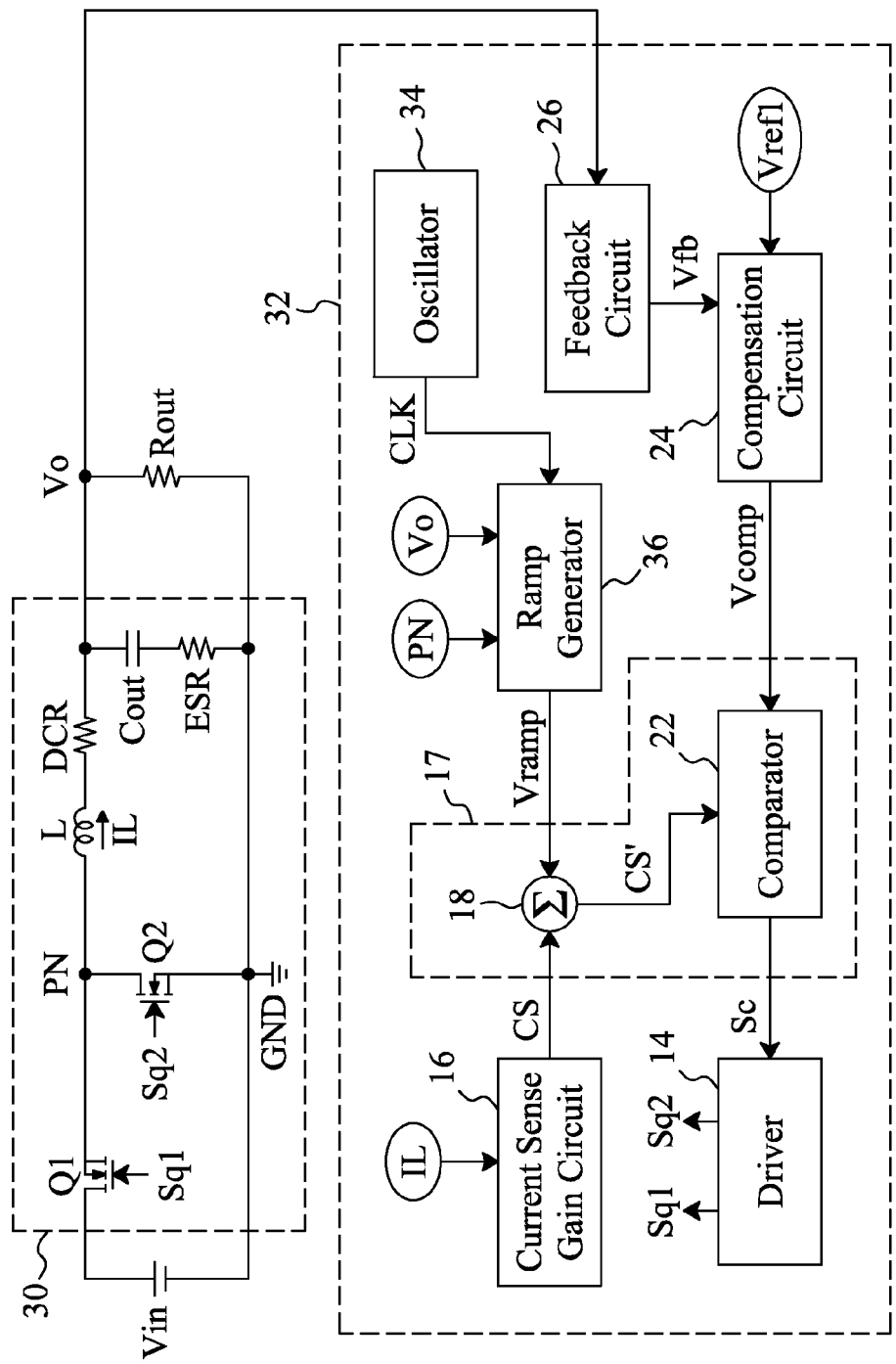
FIG. 21 is a circuit diagram of a current mode controlled buck power converter using another control circuit according to the present invention.

As mentioned above, since the input voltage Vin in the circuits of FIGS. 3, 5, 16 and 18 may be replaced by the voltage on the phase node PN, the input voltage Vin of the ramp generator 36 shown in FIG. 2 also may be replaced by the voltage on the phase node PN, as illustrated by the embodiment shown in FIG. 21.

Figure 8:
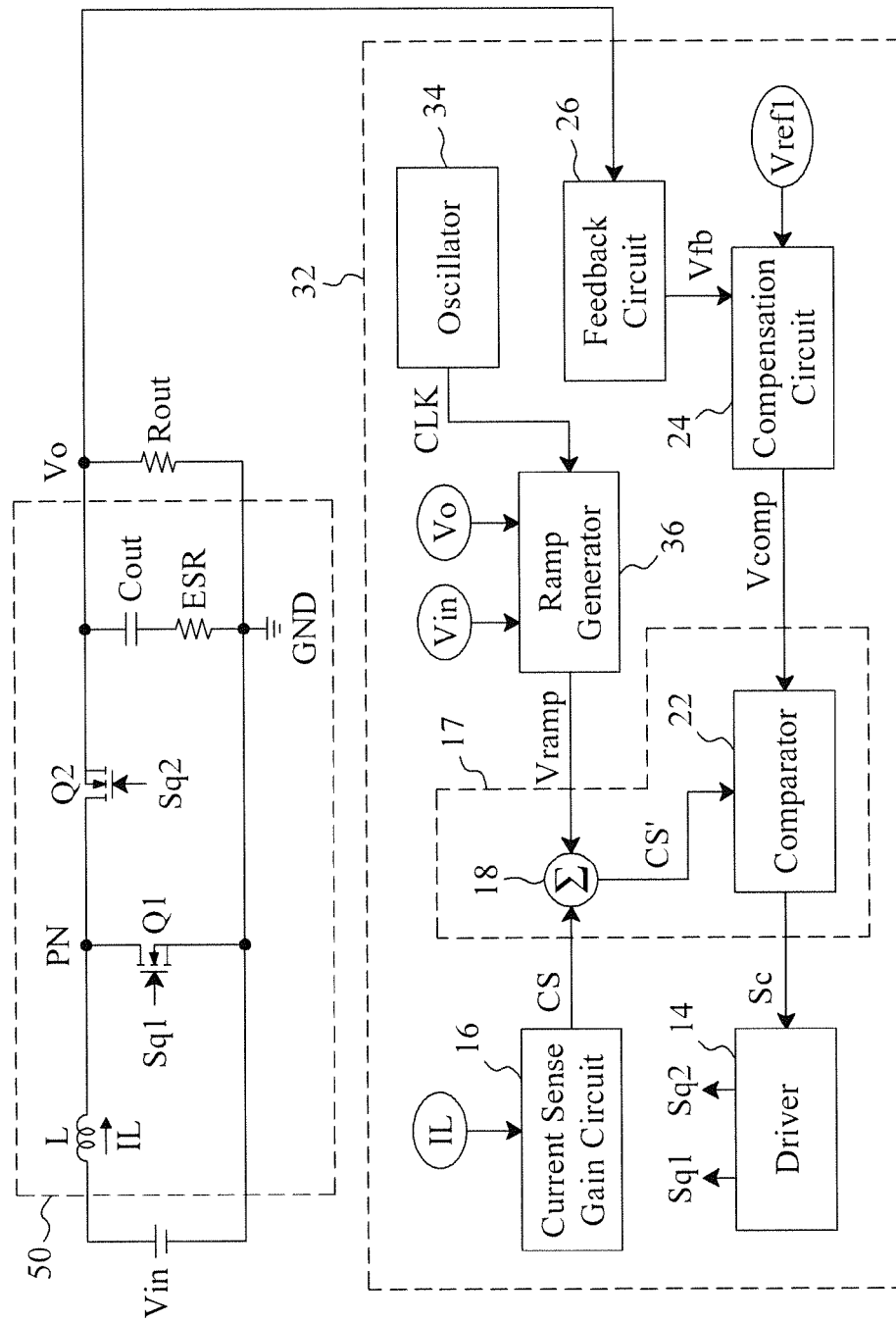
FIG. 8 is a circuit diagram of a current mode controlled boost power converter using a control circuit according to the present invention.

FIG. 8 is a circuit diagram of a current mode controlled boost power converter using a control circuit according to the present invention, which includes a boost switching regulator 50 for converting an input voltage Vin into an output voltage Vo, and the control circuit 32 for providing the control signals Sq1 and Sq2 to drive the boost switching regulator 50. The boost switching regulator 50 includes an inductor L connected between a power input terminal Vin and a phase node PN, a power switch Q1 connected between the phase node PN and a ground terminal GND, and controlled by the control signal Sq1, a power switch Q2 connected between the phase node PN and a power output terminal Vo, and controlled by the control signal Sq2, and a capacitor Cout connected between the power output terminal Vo and the ground terminal GND. In this embodiment, the control circuit 32 operates similarly to that of FIG. 2.

Figure 9:
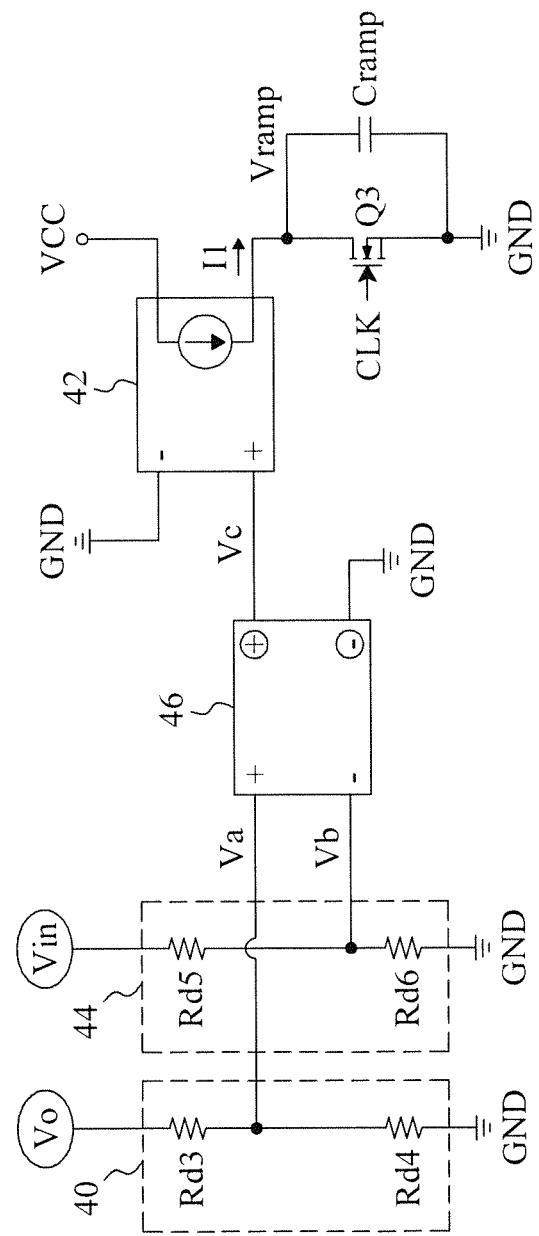
FIG. 9 is a circuit diagram of a first embodiment for the ramp generator shown in FIG. 8.

FIG. 9 is a circuit diagram of a first embodiment for the ramp generator 36 shown in FIG. 8, which includes the same elements 40-46, Q3 and Cramp as that of FIG. 5, while the voltage divider 40 divides the output voltage Vo to generate an output voltage dependent signal Va applied to the positive input terminal of the voltage controlled voltage source 46, the voltage divider 44 divides the input voltage Vin to generate an input voltage dependent signal Vb applied to the negative input terminal of the voltage controlled voltage source 46, and the voltage controlled current source 42 has its negative input terminal grounded, and its positive input terminal receiving the differential voltage Vc generated by the voltage controlled voltage source 46 responsive to the difference between the signals Va and Vb. Since the circuit of FIG. 8 is a boost power converter, the input voltage Vin is smaller than the output voltage Vo, and thus the output voltage dependent signal Va is larger than the input voltage dependent signal Vb, and further, the smaller the input voltage Vin is, the larger the duty cycle of the power switch Q1 is, and therefore the larger the difference between the signals Va and Vb is, so the larger the difference between the signal Vc and the ground potential GND is, which makes the charge current I1 increase, thereby increasing the peak of the ramp signal Vramp.

Figure 10:
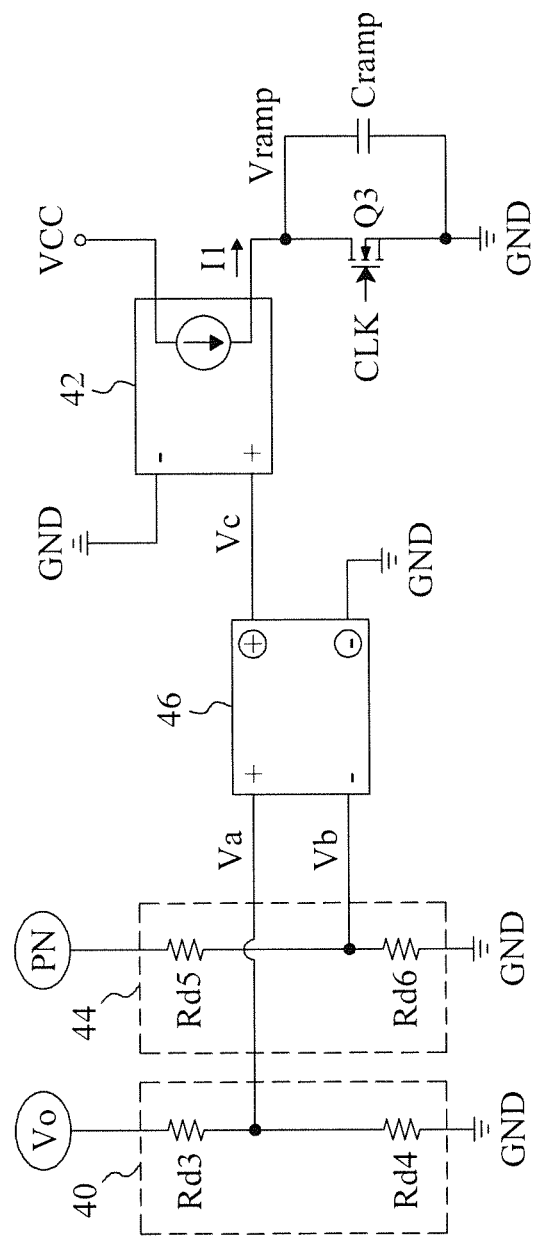
FIG. 10 is a circuit diagram of a second embodiment for the ramp generator shown in FIG. 8.

The input voltage Vin and the output voltage Vo in the circuit of FIG. 9 may be replaced by other signals related to the input voltage Vin and other signals related to the output voltage Vo. FIG. 10 is a circuit diagram of a second embodiment for the ramp generator 36 shown in FIG. 8, which has the same circuit as that of FIG. 9, while the input voltage Vin is replaced by the voltage on the phase node PN, and thus the voltage divider 44 divides the voltage on the phase node PN to generate the input voltage dependent signal Vb. As the input voltage Vin decreases, the voltage on the phase node PN decreases, so the difference between the signals Va and Vb becomes larger and thus increases the differential voltage Vc, thereby increasing the charge current I1 and in turn increasing the peak of the ramp signal Vramp.

Figure 22:
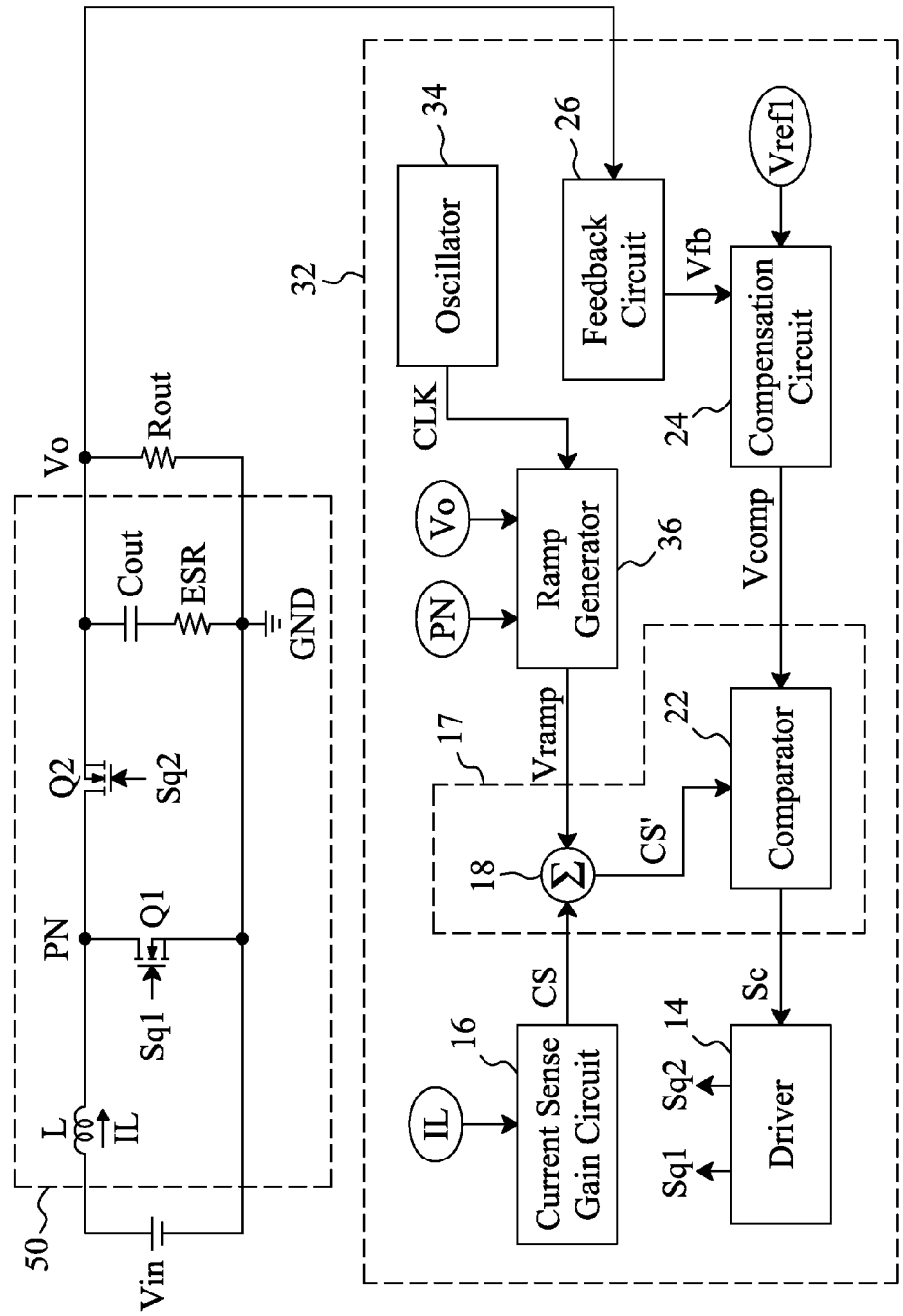
FIG. 22 is a circuit diagram of a current mode controlled boost power converter using another control circuit according to the present invention.

The circuits of the ramp generator 36 shown in FIGS. 3, 4, 16, 17, 18, 19 and 20 also may be applied to the current mode controlled boost power converter of FIG. 8, while the peak of the ramp signal Vramp of FIG. 18 will increase when the difference between the input voltage Vin and the output voltage V0 increases, and the peak of the ramp signal Vramp of FIG. 20 will increase when the difference between the voltage on the phase node PN and the output voltage V0 increases. Besides, the input voltage Vin of the ramp generator 36 shown in FIG. 8 also may be replaced by the voltage on the phase node PN, as illustrated by the embodiment shown in FIG. 22.

Figure 11:
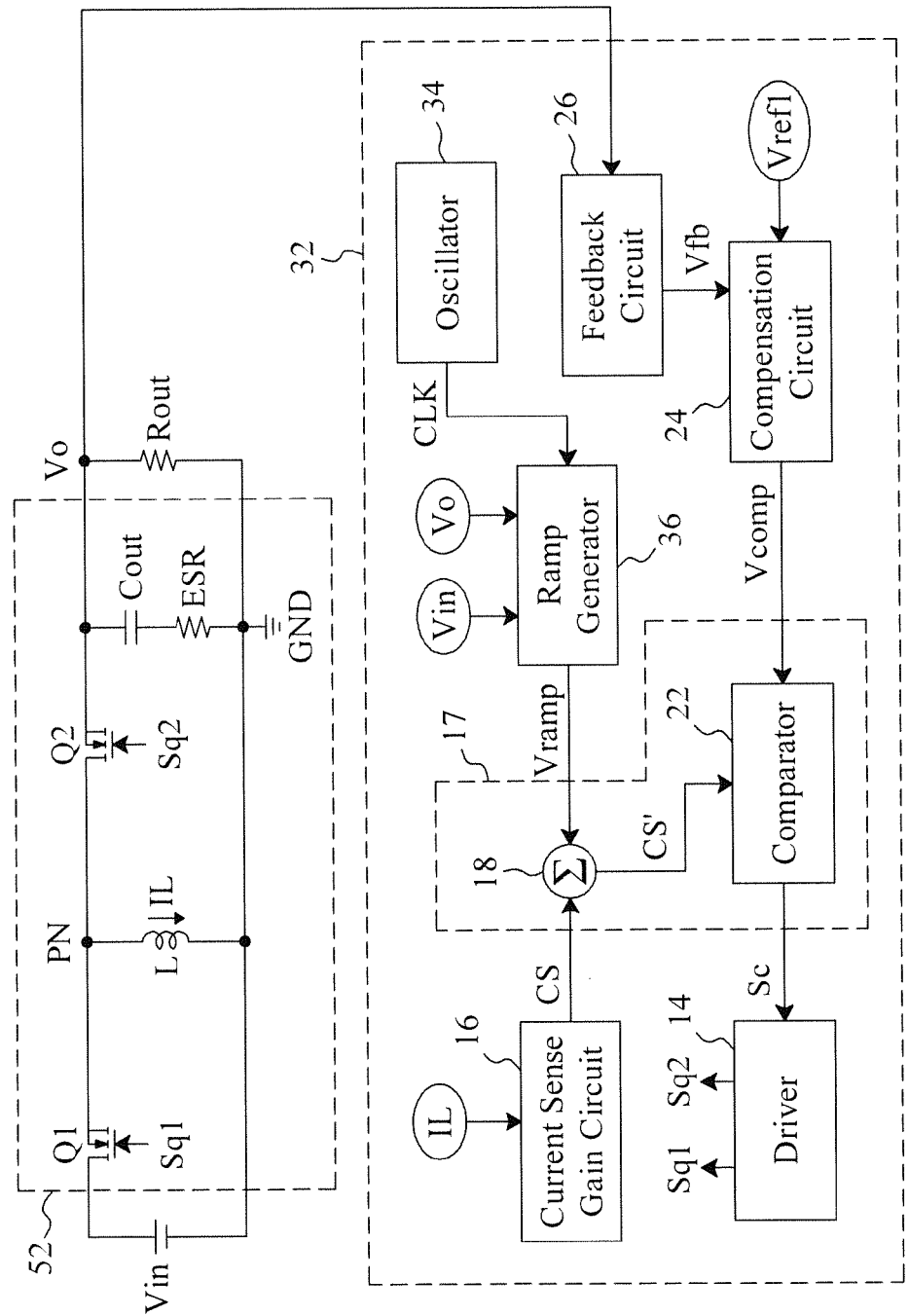
FIG. 11 is a circuit diagram of a current mode controlled buck-boost power converter using a control circuit according to the present invention.
Figure 23:
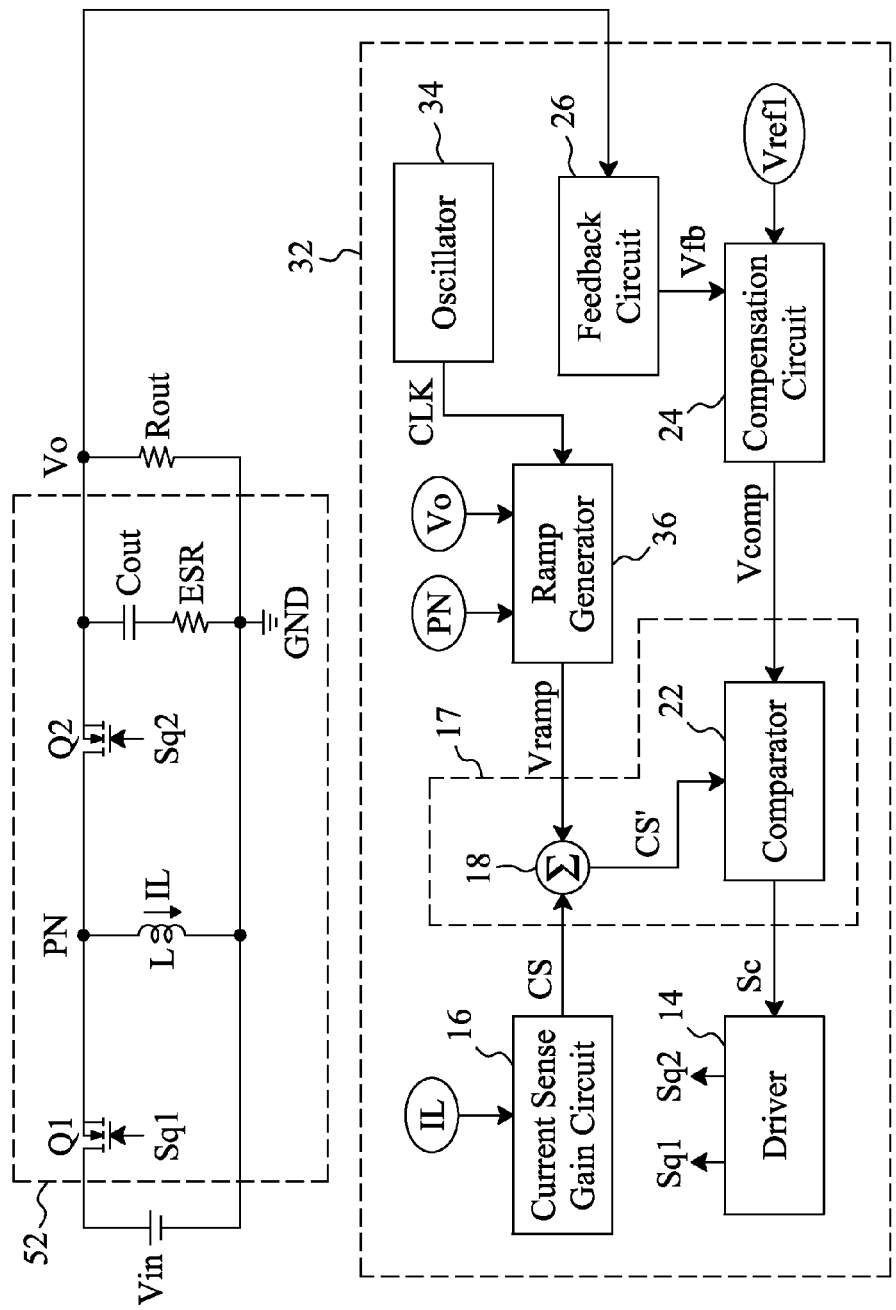
FIG. 23 is a circuit diagram of a current mode controlled buck-boost power converter using another control circuit according to the present invention.

FIG. 11 is a circuit diagram of a current mode controlled buck-boost power converter using a control circuit according to the present invention, which includes a buck-boost switching regulator 52 for converting an input voltage Vin into an output voltage Vo, and the control circuit 32 for providing the control signals Sq1 and Sq2 to drive the buck-boost switching regulator 52. The buck-boost switching regulator 52 includes a power switch Q1 connected between a power input terminal Vin and a phase node PN and controlled by the control signal Sq1, an inductor L connected between the phase node PN and a ground terminal GND, a power switch Q2 connected between the phase node PN and a power output terminal Vo and controlled by the control signal Sq2, and a capacitor Cout connected between the output terminal Vo and the ground terminal GND. The control circuit 32 in this embodiment has the same circuit as that of FIG. 2, and the circuits of the ramp generator 36 shown in FIGS. 3, 4, 6, 16, 17, 18, 19 and 20 also may be applied to this embodiment. Besides, the input voltage Vin of the ramp generator 36 shown in FIG. 11 also may be replaced by the voltage on the phase node PN, as illustrated by the embodiment shown in FIG. 23.

While the above embodiments all illustrate adjustment of the peak of the ramp signal Vramp, it is appreciated that from which teaching, more embodiments including adjustment of the valley of the ramp signal Vramp can be easily designed depending on demands, since setting the peak and the valley of a ramp signal are both well known.

When a current mode controlled power converter using a control circuit according to the present invention begins a start-up or a soft start-up, the peak or the valley of the ramp signal Vramp may be set depending on an input voltage dependent signal first, and after the start-up or soft start-up finishes, the peak or the valley of the ramp signal Vramp may be remained subject to the input voltage dependent signal or alternatively, may be adjusted depending on an output voltage dependent signal, or depending on the input voltage dependent signal and an output voltage dependent signal.

Figure 12:
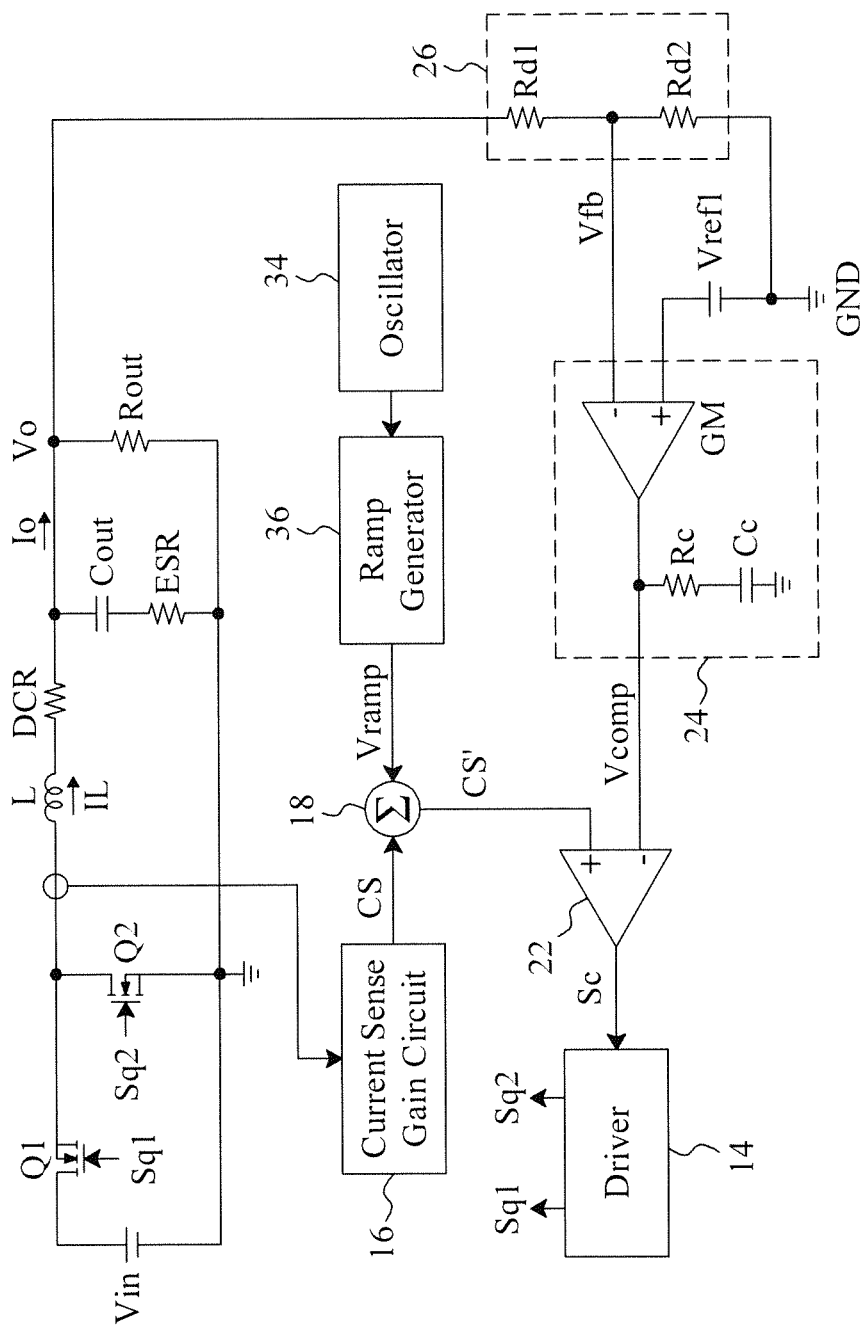
FIG. 12 is a circuit diagram of a current mode controlled buck power converter based on a commercial power integrated circuit.
Figure 13:
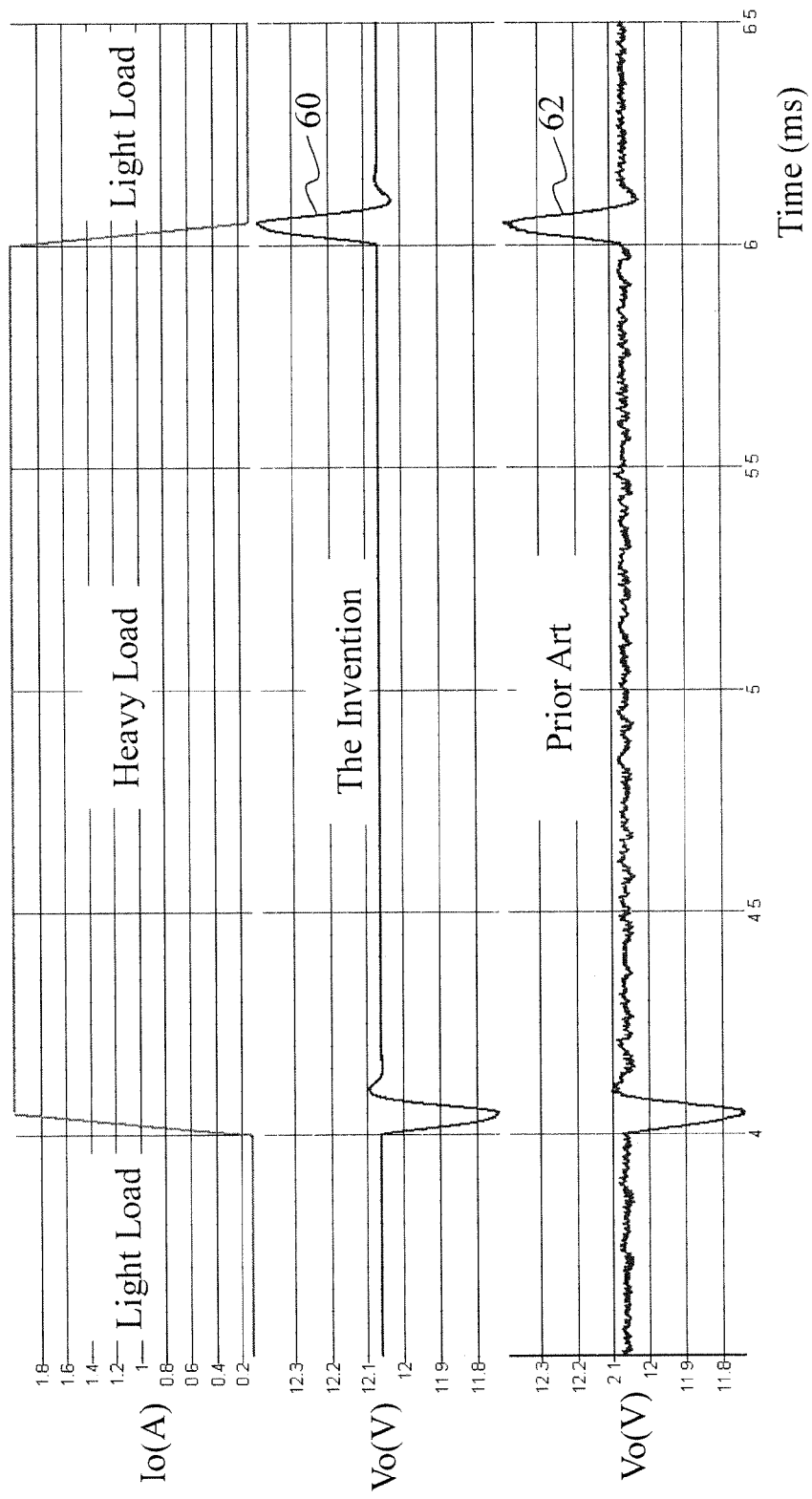
FIG. 13 is a waveform diagram of the transient response of the circuit shown in FIG. 12 using a conventional method and a method according to the present invention.

FIG. 12 is a circuit diagram of a current mode controlled buck power converter based on a commercial power integrated circuit (IC), assuming that the input voltage Vin is 13V, the output voltage Vo is 12V, the load current Io varies between 0.1 A and 2 A, the switching frequency is 380 kHz, the inductor L is 15 µH, the capacitor Cout is 22 µF, the resistor Rc is 10 kΩ, the capacitor Cc is 1.5 nF, the resistor Rd1 is 88.7 kΩ, and the resistor Rd2 is 10 kΩ, where the resistor Rc and the capacitor Cc are compensation parameters of the compensation circuit 24. FIG. 13 is a waveform diagram of the transient response obtained from the circuit shown in FIG. 12 using a conventional method and a method according to the present invention, in which waveform 60 is the output voltage Vo by using a method according to the present invention, and waveform 62 is the output voltage Vo by using a conventional method. FIG. 14 is a recommended component selection of the commercial power IC. In this experiment, since the used parameters of the inductor L, the resistor Rc and the capacitor Cc are different from those for Vo=12V in the recommended component selection of FIG. 14, if the ramp generator shown in FIG. 12 provides a constant ramp signal Vramp as in a conventional method, the output voltage Vo will become unstable due to sub-harmonic, as shown by the waveform 62 of FIG. 13. When the ramp generator shown in FIG. 12 dynamically adjusts the peak or the valley of the ramp signal Vramp by using a method according to the present invention, sub-harmonic is eliminated and the output voltage Vo remains stable, as shown by the waveform 60 of FIG. 13.

With an invariant inductor L, under different conditions of the input voltage Vin and the output voltage Vo, a current mode controlled buck power converter using a control circuit according to the present invention still generates a stable output voltage Vo, without sub-harmonic which otherwise may happen. When using a control circuit according to the present invention, since there is no need to change the inductor L for stable output, the parameters Rc and Cc for the compensation circuit 24 do not have to change, thereby providing users a simplified recommended component selection, as the part circled by the dotted line shown in FIG. 15. Since the inductor L and the compensation parameters Rc and Cc are invariant for different conditions of the input voltage Vin and the output voltage Vo, the risk that the originally provided parameters for the compensation circuit 24 would cause an unstable system can be eliminated. In addition, since a same inductor L is adaptive to different conditions of the input voltage Vin and the output voltage Vo, the circuit design is simpler and more convenient in terms of applications. In the recommended component selections of FIGS. 14 and 15, the change of the resistor Rd1 is for a constant internal reference voltage Vref1, so when the output voltage Vo changes, the resistor Rd1 is also altered accordingly.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for a current mode controlled power converter including a switching regulator for converting an input voltage into an output voltage responsive to a control signal, the switching regulator having an inductor and at least one power switch connected to the inductor by a phase node, the control circuit comprising:
   a feedback circuit connected to the switching regulator, detecting the output voltage to generate a feedback signal;
   a compensation circuit connected to the feedback circuit, amplifying a difference between the feedback signal and a first reference voltage to generate an error signal;
   a current sense gain circuit connected to the switching regulator, detecting an inductor current of the inductor to generate a current sense signal;
   a ramp generator providing a ramp signal having a peak or a valley adjusted depending on one or more of an input voltage dependent signal, an output voltage dependent signal and a signal related to the voltage of the phase node;

a modulator connected to the compensation circuit, the current sense gain circuit and the ramp generator, generating a modulation signal according to the error signal, the current sense signal and the ramp signal; and a driver connected to the modulator, generating the control signal responsive to the modulation signal to switch the at least one power switch, wherein the ramp generator comprises:

a capacitor charged or discharged to provide the ramp signal;

a switch shunt to the capacitor and controlled by a clock to switch the capacitor to be charged or discharged;

a voltage controlled voltage source controlled by a difference between two of the input voltage dependent signal, the output voltage dependent signal and the signal related to the voltage of the phase node to generate a differential voltage; and a voltage controlled current source connected to the capacitor and the voltage controlled voltage source, controlled by a difference between the differential voltage and a second reference voltage to provide a charge current for charging the capacitor to adjust the peak or valley of the ramp signal.

2. The control circuit of claim 1, wherein the compensation circuit and the inductor have invariant parameters for different conditions of the input voltage and the output voltage.

3. A control circuit for a current mode controlled power converter including a switching regulator for converting an input voltage into an output voltage responsive to a control signal, the switching regulator having an inductor and at least one power switch connected to the inductor by a phase node, the control circuit comprising:

a feedback circuit connected to the switching regulator, detecting the output voltage to generate a feedback signal;

a compensation circuit connected to the feedback circuit, amplifying a difference between the feedback signal and a first reference voltage to generate an error signal;

a current sense gain circuit connected to the switching regulator, detecting an inductor current of the inductor to generate a current sense signal;

a ramp generator providing a ramp signal having a peak or a valley adjusted depending on one or more of an input voltage dependent signal, an output voltage dependent signal and a signal related to the voltage of the phase node;

a modulator connected to the compensation circuit, the current sense gain circuit and the ramp generator, generating a modulation signal according to the error signal, the current sense signal and the ramp signal; and a driver connected to the modulator, generating the control signal responsive to the modulation signal to switch the at least one power switch;

wherein the ramp generator comprises:

a capacitor charged or discharged to provide the ramp signal;

a switch shunt to the capacitor and controlled by a clock to switch the capacitor to be charged or discharged; and a voltage controlled current source connected to the capacitor, controlled by a differential voltage between one of the input voltage dependent signal, the output voltage dependent signal and the signal related to the voltage of the phase node and a second reference voltage to provide a charge current for charging the capacitor to adjust the peak or valley of the ramp signal.

4. The control circuit of claim 1, wherein the modulator comprises:

an adder connected to the current sense gain circuit and the ramp generator, combining the current sense signal and the ramp signal to generate a modified current sense signal; and a comparator connected to the compensation circuit and the adder, comparing the error signal with the modified current sense signal to generate the modulation signal.

5. A control method for a current mode controlled power converter including a switching regulator for converting an input voltage into an output voltage responsive to a control signal, the switching regulator having an inductor and at least one power switch connected to the inductor by a phase node, the control method comprising the steps of:

(A) detecting the output voltage to generate a feedback signal;

(B) amplifying a difference between the feedback signal and a first reference voltage to generate an error signal;

(C) detecting an inductor current of the inductor to generate a current sense signal;

(D) providing a ramp signal having a peak or a valley adjusted depending on one or more of an input voltage dependent signal, an output voltage dependent signal and a signal related to the voltage of the phase node;

(E) generating a modulation signal according to the error signal, the current sense signal and the ramp signal; and (F) generating the control signal responsive to the modulation signal to switch the at least one power switch;

wherein the step D comprises the steps of:

charging or discharging a capacitor responsive to a clock to generate the ramp signal;

generating a differential voltage responsive to a difference between two of the input voltage dependent signal, the output voltage dependent signal and the signal related to the voltage of the phase node; and providing a charge current for charging the capacitor responsive to a difference between the differential voltage and a second reference voltage to adjust the peak or valley of the ramp signal.

6. A control method for a current mode controlled power converter including a switching regulator for converting an input voltage into an output voltage responsive to a control signal, the switching regulator having an inductor and at least one power switch connected to the inductor by a phase node, the control method comprising the steps of:

(A) detecting the output voltage to generate a feedback signal;

(B) amplifying a difference between the feedback signal and a first reference voltage to generate an error signal;

(C) detecting an inductor current of the inductor to generate a current sense signal;

(D) providing a ramp signal having a peak or a valley adjusted depending on one or more of an input voltage dependent signal, an output voltage dependent signal and a signal related to the voltage of the phase node;

(E) generating a modulation signal according to the error signal, the current sense signal and the ramp signal; and (F) generating the control signal responsive to the modulation signal to switch the at least one power switch, wherein the step D comprises the steps of:

charging or discharging a capacitor responsive to a clock to generate the ramp signal; and providing a charge current for charging the capacitor responsive to a differential voltage between one of the input voltage dependent signal, the output voltage dependent signal and the signal related to the voltage of the phase node and a second reference voltage to adjust the peak or valley of the ramp signal.

7. The control method of claim 5, wherein the step E comprises the steps of:
combining the current sense signal and the ramp signal to generate a modified current sense signal; and
comparing the error signal with the modified current sense signal to generate the modulation signal.

8. The control circuit of claim 3, wherein the compensation circuit and the inductor have invariant parameters for different conditions of the input voltage and the output voltage.

9. The control circuit of claim 3, wherein the modulator comprises:
an adder connected to the current sense gain circuit and the ramp generator, combining the current sense signal and the ramp signal to generate a modified current sense signal; and
a comparator connected to the compensation circuit and the adder, comparing the error signal with the modified current sense signal to generate the modulation signal.

10. The control method of claim 6, wherein the step E comprises the steps of:
combining the current sense signal and the ramp signal to generate a modified current sense signal; and
comparing the error signal with the modified current sense signal to generate the modulation signal.

* * * * *